United States Patent
Thibault et al.

(10) Patent No.: US 10,807,589 B2
(45) Date of Patent: Oct. 20, 2020

(54) METHOD AND SYSTEM FOR CONTROLLING A HYBRID PROPULSION SYSTEM OPTIMIZING FUEL CONSUMPTION AND POLLUTING EMISSIONS

(71) Applicant: IFP Energies nouvelles, Rueil-Malmaison (FR)

(72) Inventors: Laurent Thibault, Courbevoie (FR); Olivier Grondin, Bois-Colombes (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 375 days.

(21) Appl. No.: 15/746,878

(22) PCT Filed: Jun. 22, 2016

(86) PCT No.: PCT/EP2016/064390
§ 371 (c)(1),
(2) Date: Jan. 23, 2018

(87) PCT Pub. No.: WO2017/016759
PCT Pub. Date: Feb. 2, 2017

(65) Prior Publication Data
US 2020/0101966 A1    Apr. 2, 2020

(30) Foreign Application Priority Data

Jul. 24, 2015    (FR) ...................................... 15 57069

(51) Int. Cl.
*B60W 20/16*    (2016.01)
*B60L 50/60*    (2019.01)
(Continued)

(52) U.S. Cl.
CPC ............. *B60W 20/16* (2016.01); *B60L 50/66* (2019.02); *B60W 10/06* (2013.01); *B60W 10/08* (2013.01);
(Continued)

(58) Field of Classification Search
CPC ...... B60W 20/16; B60W 10/06; B60W 10/08; B60W 20/20; B60W 30/188; B60L 50/66;
(Continued)

(56) References Cited

U.S. PATENT DOCUMENTS

2007/0089406 A1    4/2007    Doring
2009/0118884 A1    5/2009    Heap
(Continued)

FOREIGN PATENT DOCUMENTS

DE    19836955 A1 *    3/2000    ............ F01N 11/005
DE    19836955 A1    3/2000
(Continued)

OTHER PUBLICATIONS

Machine Translation of DE19836955 (Year: 1998).*
International Search Report for PCT/EP2016/064390 dated Sep. 16, 2016; English translation submitted herewith (7 pages).

*Primary Examiner* — Anne Marie Antonucci
*Assistant Examiner* — Andrew J Cromer
(74) *Attorney, Agent, or Firm* — Fitch, Even, Tabin & Flannery LLP (57) ABSTRACT

The invention relates to a method of controlling a hybrid propulsion system of a vehicle, wherein a control (COM) (minimizing consumption and pollutant emissions at the after-treatment system outlet) is defined. The control method is based on minimizing a cost function (H) of a model (MOD) of the propulsion system. Thus, the method according to the invention allows simultaneous minimizing of fuel (Continued)

consumption and pollution emissions by accounting for after-treatment system efficiency.

27 Claims, 5 Drawing Sheets (51) Int. Cl.
*B60W 10/06* (2006.01)
*B60W 10/08* (2006.01)
*F02M 26/00* (2016.01)
*F01N 3/021* (2006.01)
*F01N 3/20* (2006.01)

(52) U.S. Cl.
CPC ............ *F01N 3/021* (2013.01); *F01N 3/2066* (2013.01); *F02M 26/00* (2016.02)

(58) Field of Classification Search
CPC ....... F02M 26/00; F01N 3/021; F01N 3/2066; F01N 9/005; F01N 11/005; F01N 2550/03; B60K 6/448; Y02T 10/6221; F02D 41/0235
See application file for complete search history.

(56) References Cited

U.S. PATENT DOCUMENTS

2013/0131956 A1   5/2013  Thibault
2013/0332015 A1*  12/2013 Dextreit ................ B60W 10/06
                                                701/22

FOREIGN PATENT DOCUMENTS

| DE | 102006036443 A1 | 2/2008 |
| DE | 102007019989 A1 | 10/2008 |
| EP | 1777384 A1 | 4/2007 |
| EP | 2055585 A2 | 5/2009 |
| FR | 2982824 A1 | 5/2013 |
| FR | 3008943 A1 | 1/2015 |
| GB | 2483371 A | 3/2012 |

* cited by examiner

METHOD AND SYSTEM FOR CONTROLLING A HYBRID PROPULSION SYSTEM OPTIMIZING FUEL CONSUMPTION AND POLLUTING EMISSIONS

CROSS REFERENCE TO RELATED APPLICATIONS

Reference is made to patent application PCT/EP2016/064390, which application is incorporated herein by reference in its entirety.

BACKGROUND OF THE INVENTION

Field of the Invention

The present invention relates to engine control and more particularly to the control of a hybrid propulsion of a system vehicle, in order to reduce pollutant emissions. A hybrid vehicle is a vehicle comprising at least an electric machine and a thermal engine for traction of the vehicle.

Description of the Prior Art

The reduction of nitrogen oxides emissions (NOx) is a major challenge for the development of engines, notably diesel engines. Drastic approval thresholds lead to the use of very expensive exhaust gas after-treatment systems. In this context, diesel hybridization is economically interesting, provided that it allows NOx emissions reduction at its source. Indeed, addition of an electric motor provides a degree of freedom for the selection of the thermal engine operating points. Interesting points in terms of fuel consumption and NOx emissions can therefore be this focused. The after-treatment size and thus cost can then be reduced, thus compensating for the additional cost of hybridization. Furthermore, fuel consumption can also be significantly lowered, notably through energy recovery, such as regenerative braking.

Energy supervision thus is a key element in the development of diesel hybrid propulsion systems. It is more complex than in the case of gasoline engines where taking into account the consumption and the catalyst temperature is sufficient. For a diesel hybrid engine, one of the problems involved is finding a compromise between NOx emissions and fuel consumption.

Furthermore, the temperature of the after-treatment system needs to be accounted for in the energy supervision. Indeed, minimizing NOx emissions at the engine outlet is not enough because the after-treatment system efficiency, which has a major impact on the emissions discharged to the atmosphere, has to be taken into account. In fact, depending on the after-treatment temperature, the efficiency thereof can go from all to nothing. It is therefore essential to optimize after-treatment actuation and to keep it at a sufficient temperature during driving. A strategy that would simply minimize emissions at the thermal engine outlet without taking after-treatment into account is not necessarily advantageous in terms of NOx emissions reduction at the exhaust because the gains obtained at the engine outlet can be compensated for (and exceeded) by a decrease in the after-treatment efficiency.

There are two major families of energy management laws for hybrid vehicles.

The first family uses heuristic techniques based on the experience of the designer who sets arbitrary rules. These heuristic laws were rapidly adopted by industrials due to their ease of implementation and robustness. The following documents illustrate examples of heuristic strategies enabling NOx emissions to be reduced for diesel hybrid vehicles:

D. Ambuhl, A. Sciarretta, C. Onder, L. Guzzella, S. Sterzing, K. Mann, D. Kraft, et M. Küsell, A Causal Operation Strategy for Hybrid Electric Vehicles Based on Optimal Control Theory. In Proceedings of the 4th Symposium on Hybrid Vehicles and Energy Management, 2007.

N. Lindenkamp, C.-P. Stöber-Schmidt & P. Eilts, Strategies for Reducing NOx and Particulate Matter Emissions in Diesel Hybrid Electric Vehicles, SAE Paper no 2009-01-1305, 2009.

However, heuristic approaches involve two major drawbacks which are first they do not guarantee optimality of the proposed solution, and second they are specific to a given application and they therefore require significant calibration work whenever they have to be deployed on a new application.

Conversely, the second family concerns model-based control approaches allowing guarantee of the quality of the solution that is obtained, to the accuracy of the model, and once developed, they are easily reusable for various vehicle applications since the physical parameters that differ just need to be updated. Such model-based approaches, based on the optimal control theory, have thus been widely used to solve the problem of hybrid vehicle energy supervision. The following documents illustrate such methods:

A. Sciarretta, L. Guzzella, "Control of Hybrid Electric Vehicles. Optimal energy-Management Strategies", Control Systems Magazine, vol. 27, no. 2, April 2007, pp. 60-70.

R. Cipollone, A. Sciarretta, "Analysis of the Potential Performance of a Combined Hybrid Vehicle with Optimal Supervisory Control", Proc. of the IEEE International Conference on Control Applications, Munich, Germany, Oct. 4-6, 2006 (invited paper).

J. Liu, H. Peng, "Control Optimization for a Power-Split Hybrid Vehicle", in Proc. of the American Control Conference, 2006.

Initially, most of these publications were limited to the optimization of fuel consumption. However, this criterion is not sufficient and such strategies can lead to a significant increase in pollutant emissions, especially NOx emissions. A method for taking into account pollutant emissions at the engine outlet is provided in patent application FR-2,982,824, corresponding to US Published Application US-2013/0,131,956 and in the following document:

O. Grondin, L. Thibault, and C. Querel—Transient Torque Control of a Diesel Hybrid Powertrain for NOx limitation, Engine and Powertrain Control, Simulation and Modeling, Volume #3 2012.

Although experimentally validated, this approach does however not allow pollution emissions at the exhaust (at the after-treatment system outlet) to be controlled. In some cases, this approach may degrade the pollution emissions at the exhaust In order to minimize the NOx at the thermal engine outlet, this type of strategy tends to reduce the load of the thermal engine operating points, which decreases the production of enthalpy at the exhaust and can prevent the after-treatment system from reaching its activation temperature. This proves very problematic insofar as the only emissions that count are those released to the atmosphere at the exhaust, and not those directly at the thermal engine outlet.

The consideration of the after-treatment thermal dynamics within the context of an energy supervision based on an optimal control was presented in the following document:

A. Chasse, G. Corde, A. Del Mastro, and F. Perez, "Online Optimal Control of a Parallel Hybrid with After-Treatment Constraint Integration," in Proceedings of the IEEE Vehicle Power and Propulsion Conference, 2010.

This control concerns a gasoline application. The minimization criterion used in this study takes account of the fuel consumption, optimization of the exhaust thermal dynamics being provided by taking account of the after-treatment temperature as a state within the optimization problem. Such an approach is effective for optimizing the consumption rapidly and for accelerating the after-treatment actuation. However, it does not directly consider the pollution emissions and it can therefore cause their increase, notably with diesel applications.

SUMMARY OF THE INVENTION

The invention is a method of controlling a hybrid propulsion system for a vehicle, wherein a control (torques and/or state of the kinematic chain) that minimizes consumption and pollutant emissions at the outlet of the after-treatment system is defined. The control method is based on a minimization of a cost function of a model of the propulsion system. Thus, the method according to the invention allows simultaneous minimizing of the fuel consumption and the pollution emissions by taking into account the after-treatment system efficiency. Furthermore, the control method according to the invention allows, by use of a model, to integrate the physical phenomena involved in the hybrid propulsion system.

The invention relates to a method of controlling a hybrid propulsion system comprising at least one electric machine, at least one thermal engine, at least one electrical energy storage system supplying the electric machine, a kinematic chain for coupling the electric machine and the thermal engine, and a pollution emissions after-treatment system at the thermal engine outlet, wherein a torque setpoint $TPT_{sp}$ of the propulsion system is acquired. For this method, the following steps are carried out:

a) discretizing at least part of the controls allowable by the propulsion system to reach the torque setpoint $TPT_{sp}$ of the propulsion system,
b) constructing a model of the propulsion system connecting a cost function to a control of the propulsion system, the cost function being a function of the consumption of the propulsion system and of the pollution emissions at the outlet of the after-treatment system,
c) determining a control of the propulsion system by minimizing the cost function of the propulsion system model for the discretized allowable controls, and
d) applying the determined control to the hybrid propulsion system.

According to the invention, the control is a torque setpoint of the thermal engine $T_{eng\_sp}$ and/or a torque setpoint of the electric machine $T_{mot\_sp}$ and/or a control setpoint of the kinematic chain $ECC_{sp}$.

According to an embodiment of the invention, the torque setpoint of the propulsion system is filtered $TPT_{flt\_sp}$.

Advantageously, a torque setpoint of the thermal engine $T_{eng\_sp}$ and/or a torque setpoint of the electric machine $T_{mot\_sp}$ is determined by use of the filtered torque setpoint of the propulsion system $TPT_{flt\_sp}$ and steps a) to c) are repeated to determine a control setpoint of the kinematic chain $ECC_{sp}$ by use of the unfiltered torque setpoint $TPT_{sp}$, and the controls are applied to the hybrid propulsion system.

According to a variant embodiment, the discretization accounts for at least one state of charge of the electrical energy storage system and/or of the speed of the propulsion system.

According to an embodiment of the invention, the cost function of the model of the hybrid propulsion system is written with a formula of the following type:

$$H(u_1,u_2,x,t)=f(u_1,u_2,t)+\lambda(t)\times \dot{x}(u_1,u_2,x,t)$$

with:

$$f(u1,u_2,t)=(1-\alpha)\times \dot{m}_f(u_1,u_2,t)+\alpha \times \dot{m}_{NO_xTP}(u_1,u_2,t),$$

$u_1$ is torque control of the thermal engine $T_{eng}$;
$u_2$ is control of the kinematic chain ECC;
x is state of charge of the electrical energy storage system;
$m_f$ is consumption of the thermal engine;
$m_{NO_xTP}$ are NOx emissions at an outlet of the after-treatment system;
$\alpha$ is a calibration variable;
$\lambda$ is a Lagrange multiplier; and
t is time.

Advantageously, the consumption $m_f$ of the thermal engine is obtained using a map.

According to a feature of the invention, the pollution emissions $m_{NO_xTP}$ are obtained with an equation of the form:

$$\dot{m}_{NO_xTP}(u_1,u_2,x,t)=\dot{m}_{NO_xEO}(u_1,u_2,x,t)\times(1-\eta_{AT}(T_{AT}))$$

with:
$m_{NO_xEO}$ being pollution emissions at the outlet of the thermal engine,
$\eta_{AT}$ being efficiency of the after-treatment system, and
$T_{AT}$ being temperature of the after-treatment system.

Preferably, the pollution emissions $m_{NO_xEO}$ at the outlet of the thermal engine are determined using a model or a map.

According to an embodiment, the temperature of the after-treatment system is estimated by use of a formula of the type:

$$T_{AT}(t) = T_{AT}(t-\Delta t) + \Delta t \times \frac{h_1(t) + h_2(t)}{I}$$

with:

$$h_1(t)=k_1 \times (T_0 - T_{AT}(t-\Delta t))$$

$$h_2=k_2 \times [T_{AT\_QS}(u_1(t-\Delta t), u_2(t-\Delta t))-T_{AT}(t-\Delta t)]$$

$T_{AT\_QS}(u_1(t-\Delta t), u_2(t-\Delta t))$ being measured steady-state temperature at the after-treatment,
$\Delta t$ being a time interval,
k1 being an equivalent thermal resistance of the exchanges with the outside,
k2 being an equivalent thermal resistance of the exchanges with the exhaust gases, and
I being thermal inertia of the after-treatment system.

According to a variant embodiment, minimization is carried out by use of Pontryagin's minimum principle.

Moreover, the present invention relates to a computer program product downloadable from a communication network and/or recorded on a computer readable medium and/or controller executable, comprising program code instructions for implementing the method according to any one of the above features when the program is executed on a controller.

The invention further relates to a hybrid propulsion system for a vehicle, comprising at least one electric machine, at least one thermal engine, at least one electrical energy storage system supplying the electric machine and at least one system for after-treatment of the pollution emissions of the thermal engine. The propulsion system is controlled by the control system according to one of the above features.

The invention also relates to a vehicle, notably a motor vehicle, comprising a hybrid propulsion system as described above.

BRIEF DESCRIPTION OF THE DRAWINGS

Other features and advantages of the method according to the invention will be clear from reading the description hereafter of embodiments given by way of non limitative example, with reference to the accompanying figures wherein.

DETAILED DESCRIPTION OF THE INVENTION

The method according to the invention allows reduction of the fuel consumption and the NOx emissions at the after-treatment system outlet for a hybrid propulsion system.

According to the invention, the method allows controlling a hybrid propulsion system of a vehicle, notably a motor vehicle, comprising at least one electric machine and at least one thermal (diesel or gasoline) engine. The electric machine is powered by an electrical energy storage system. The term electrical energy storage system includes any electrical energy storage such as a battery, an accumulator, a pack, modules, supercapacitors, etc. In the rest of the description, the term battery is used to designate any electrical energy storage. The hybrid propulsion system further comprises a kinematic chain for coupling the thermal engine and the electric machine. It can be a series or parallel or mixed series/parallel kinematic chain. The kinematic chain can comprise a reduction mechanism such as a gearbox, reducers, etc., coupling such as clutches, etc. The hybrid propulsion system further comprises a system for after-treatment of the pollutant emissions (notably NOx) of the thermal engine. The most usual NOx reduction systems are exhaust gas recirculation and selective catalytic reduction. Furthermore, a particle filter can be used for hydrocarbons HC, carbon monoxide CO and fine particles.

For the method according to the invention, the following steps are carried out:

acquisition of a torque setpoint $TPT_{sp}$ of the propulsion system, discretization of at least part of the controls allowable by the propulsion system, allowing reaching of the torque setpoint of the propulsion system, construction of a model of the propulsion system connecting a cost function to a control of the propulsion system with the cost function being a function of the consumption of the propulsion system and of the pollution emissions at the outlet of the after-treatment system, determination of a control of the propulsion system by minimizing the cost function for the discretized allowable controls, and application of the control to the propulsion system.

According to the invention, the determined control can be at least one of a torque setpoint of the thermal engine $T_{eng\_sp}$ and a torque setpoint of the electric machine $T_{mot\_sp}$ and a control setpoint of the kinematic chain $ECC_{sp}$, such as for example a control setpoint for the gearbox ratio of the kinematic chain.

The torque setpoint of the propulsion system $TPT_{sp}$ corresponds to the wheel torque requested by the driver.

The control method according to the invention is performed online in real time. Thus, it determines the control without knowing in advance the path of the vehicle.

Notations

The following notations are used in the description hereafter:

| | | |
|---|---|---|
| $N_e$ | Thermal engine speed | [rpm] |
| SOC | State of charge of the battery | [%] |
| $TPT_{sp}$ | Raw (unfiltered) driver's wheel torque setpoint | [Nm] |
| $TPT_{flt\_sp}$ | Filtered driver's wheel torque setpoint | [Nm] |
| $v_{adm}$ | Allowable control vector | [—] |
| $T_{eng}$ | Thermal engine torque | [Nm] |
| $T_{eng\_v}$ | Allowable thermal engine torque vector | [Nm] |

-continued

| | | |
|---|---|---|
| $T_{eng\_sp}$ | Thermal engine torque setpoint | [Nm] |
| $T_{mot}$ | Electric machine torque | [Nm] |
| $T_{mot\_sp}$ | Electric machine torque setpoint | [Nm] |
| $V_{veh}$ | Vehicle speed | [km/h] |
| ECC | State of the kinematic chain at time t | [—] |
| $ECC_{sp}$ | Kinematic chain state setpoint | [—] |
| $ECC_v$ | Allowable kinematic chain state vector | [—] |
| $H_v$ | Hamiltonian vector (cost function) | [equivalent W] |
| $\eta_{AT}$ | After-treatment system efficiency | [—] |
| $T_{AT}$ | After-treatment system temperature | [° C.] |
| $T_{AT\_QS}$ | After-treatment system steady-state temperature | [° C.] |
| $C_{nom}$ | Nominal battery (or equivalent) capacity | [C] |
| OCV | Battery (or equivalent) open-circuit voltage | [V] |
| DCR | Battery (or equivalent) internal resistance | [Ω] |
| λ | Lagrange multiplier | [—] |
| $u_1$ | Thermal engine torque control | [Nm] |
| $u_2$ | Kinematic chain state control | [—] |
| x | State of charge of the battery | [%] |
| α | Calibration variable | [—] |
| $m_f$ | Thermal engine fuel consumption | [kg/h] |
| $m_{NO_x\_TP}$ | NOx emissions at after-treatment system outlet | [g/h] |
| $m_{NO_x\_EO}$ | NOx emissions at thermal engine outlet | [g/h] |
| I | Equivalent thermal inertia of the after-treatment system | [W/K] |
| $k_1$ | Thermal resistance of exchanges with the outside | [W/K] |
| $k_2$ | Thermal resistance of exchanges with the exhaust gas | [W/K] |
| Δt | Time interval | [s] |
| R1 | Reduction ratio of the reducer coupled with the electric machine | [—] |
| RBV | Ratio of the gearbox coupled with the thermal engine | [—] |
| Pelec | Power of the inverter supplying the electric machine | [W] |
| $\lambda_{sp}$ | Calibration variable | [—] |
| $K_p$ | Calibration variable | [—] |

The time derivative is indicated by a point above the variable.

Figure 1:
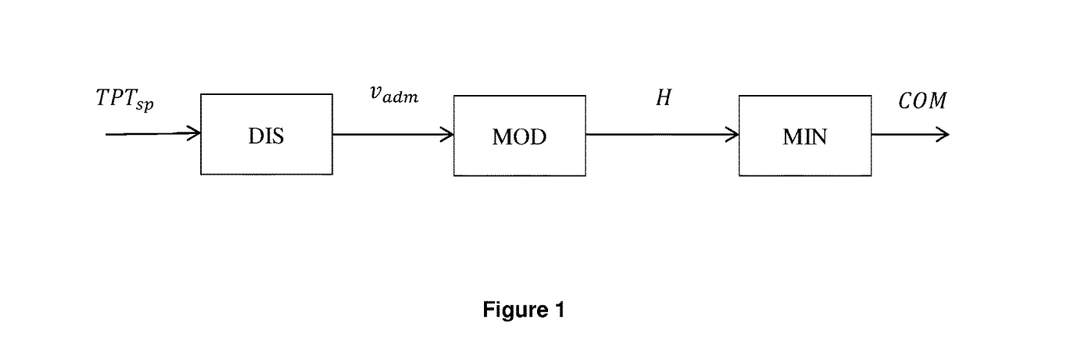
FIG. 1 schematically illustrates the steps of the method according to the invention.

FIG. 1 illustrates the various steps of the method according to the invention:
acquisition of a torque setpoint $TPT_{sp}$ of the propulsion system,
discretization DIS of at least part of the controls $v_{adm}$ allowable by the propulsion system, allowing to reach the torque setpoint of the propulsion system $TPT_{sp}$,
construction of a model MOD of the propulsion system connecting a cost function H to a control of the propulsion system, cost function H being a function of the consumption of the propulsion system and of the pollutant emissions at the after-treatment system outlet, and
determination of a control COM of the propulsion system by minimizing the cost function for the discretized allowable controls $v_{adm}$.

1) Discretization

In this stage, all the allowable controls enabling torque setpoint $TPT_{sp}$ of the hybrid propulsion system to be obtained are discretized. Discretization grids all of the allowable control solutions. The grid pitch can be selected according to a compromise between the precision of the solution (fine grid) and the acceleration of the computation time (coarse grid).

One possible discretization method produces a regular grid. This means that the grid pitch which is the distance between two elements, is constant. In this case, each element of the allowable control vector is obtained by use of the following equations:

$$v_{adm}(i) = T_{eng_{mini}} + \epsilon * (i-1)$$

where ε, the grid pitch, is simply obtained by setting the number of elements of the grid N (for example, one can select N=10, which is an order of magnitude allowing to obtain a good compromise between precision and computational speed). For example:

$$\epsilon = \frac{T_{eng_{max}} - T_{eng_{min}}}{N - 1}$$

with $T_{eng_{max}}$ being the maximum allowable torque of the thermal engine allowing reaching the torque setpoint, and $T_{eng_{min}}$ being the minimum allowable torque of the thermal engine allowing reaching the torque setpoint.

Thus in this stage, an allowable control vector $v_{adm}$ is thus determined.

According to an embodiment of the invention, allowable control vector $v_{adm}$ can comprise the vector of the allowable thermal engine torques $T_{eng\_v}$.

Moreover, allowable the control vector $v_{adm}$ can comprise the vector of the allowable kinematic chain states $ECC_v$.

2) Model Construction

A model of the hybrid propulsion system is constructed in this stage. The hybrid propulsion model is representative of the kinematic chain of the propulsion system. It can further take account of the state of charge of the battery. The hybrid propulsion model connects a cost function to a control of the propulsion system. The cost function is a function of the consumption of the propulsion system and of the pollutant emissions at the after-treatment system outlet. It allows calculation of the cost associated with each possible control, in terms of consumption and pollutant emissions (notably NOx). This cost is a calibratable compromise between the pollutant emissions at the exhaust and the fuel consumption.

The control method according to the invention applies to all hybrid architectures: series, parallel or mixed series/parallel. Depending on the architecture used, the equations modeling the hybrid traction chain are different, but the overall principle remains the same. Furthermore, the main added value of the invention is independent of the hybrid architecture being considered since it is the consideration of the pollution emissions at the exhaust in addition to the consumption. Therefore, modeling of the hybrid traction chain is presented in a non-limitative manner in the case of a parallel hybrid propulsion system. The considered architecture is illustrated (in a non-limitative manner) in FIG. 4. The hybrid propulsion system comprises a thermal engine ICE, a Stop & Start generator SSG (electric machine that automatically shuts down and restarts a thermal engine), a clutch CL, a gearbox GB and an electric machine EM. Wheels W are coupled to the hybrid propulsion system by coupling mechanisms that are schematically shown.

Figure 4:
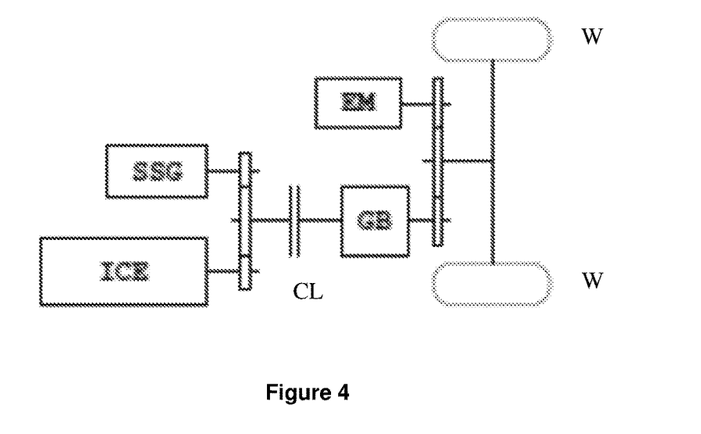
FIG. 4 illustrates an example of a hybrid propulsion system.

For a parallel hybrid propulsion system, the wheel torque balance is written as follows:

$$TPT_{sp}(t) = R_1 \times T_{mot}(t) + RBV(ECC(t)) \times T_{eng}(t)$$

There are thus two degrees of freedom to achieve the driver's requirement. By convention, the control selected here is the thermal engine torque $u_1 = T_{eng}(t)$ and the state of the kinematic chain $u_2 = ECC(t)$. It is observed that the thermal engine speed $N_e(t) = f_{BV}(u_2)$, where fBV characterizes the gear reduction ratios, is controlled through the state of the kinematic chain.

These degrees of freedom are used to minimize a calibratable (using parameter $\alpha$) compromise between fuel consumption $m_f$ and pollutant emissions $m_{NO_xTP}$ at the after-treatment system outlet:

$$J = \int_{t_0}^{t_f} f(u_1, u_2, t) dt$$

$$f(u_1, u_2, t) = (1-\alpha) \times \dot{m}_f(u_1, u_2, t) + \alpha \times \dot{m}_{NO_xTP}(u_1, u_2, t)$$

Furthermore, the dynamics of the state of charge of the battery $x(t) = SOC(t)$ is taken into account. Moreover, this state of charge is not totally free since the capacity of the battery is limited. Concerning the optimization problem, this amounts to adding a state constraint to the problem, so that the charge of the battery at the end tf of the operation is identical to the state of charge of the battery at the start t0 of the operation thereof:

$$SOC(t_f) = SOC(t_0)$$

The cost function of the model can be given by a function of the type:

$$H(u_1, u_2, x, t) = f(u_1, u_2, t) + \lambda(t) \times \dot{x}(u_1, u_2, x, t)$$

Calculation of $f(u_1, u_2, t)$

To calculate f at any time, all of the terms of the equation of f are determined.

$\alpha$ is a calibration variable allowing to adjust the compromise between consumption and pollutant emissions. The calibration of parameter $\alpha$ depends on the emissions level of the engine being considered. In general, a setting ranging between 0.2 and 0.5 can be selected for a, which allows ensuring a significant pollution emissions decrease while maintaining a favorable fuel consumption.

According to an embodiment of the invention, $\dot{m}_f = MAP(N_e, T_{eng})$ can be obtained by use of a fuel flow map (MAP), generally generated as a result of tests.

The NOx emissions at the exhaust (after-treatment system outlet) can be modeled with an equation of the form:

$$\dot{m}_{NO_xTP}(u_1, u_2, x, t) = \dot{m}_{NO_xEO}(u_1, u_2, x, t) \times (1 - \eta_{AT}(T_{AT}))$$

The NOx emissions at the engine outlet $\dot{m}_{NO_xEO}$ can be either calculated from a model or simply using a map obtained from bench tests.

The characteristic of the after-treatment system efficiency $\eta AT$ as a function of temperature $T_{AT}$ can result from characterization tests. It is also possible to take account of the influence of other variables such as the gas flow at the exhaust.

After-treatment temperature $T_{AT}$ can be estimated at any time from the following equations:

$$T_{AT}(t) = T_{AT}(t - \Delta t) + \Delta t \times \frac{h_1(t) + h_2(t)}{I}$$

where term $h_1$ corresponds to the exchanges with the outside:

$$h_1(t) = k_1 \times (T_0 - T_{AT}(t - \Delta t))$$

and where term $h_2$ corresponds to the combustion-related enthalpy release at the exhaust:

$$h_2(t) = k_2 \times [T_{AT\_QS}(u_1(t-\Delta t), u_2(t-\Delta t)) - T_{AT}(t-\Delta t)]$$

Figure 5:
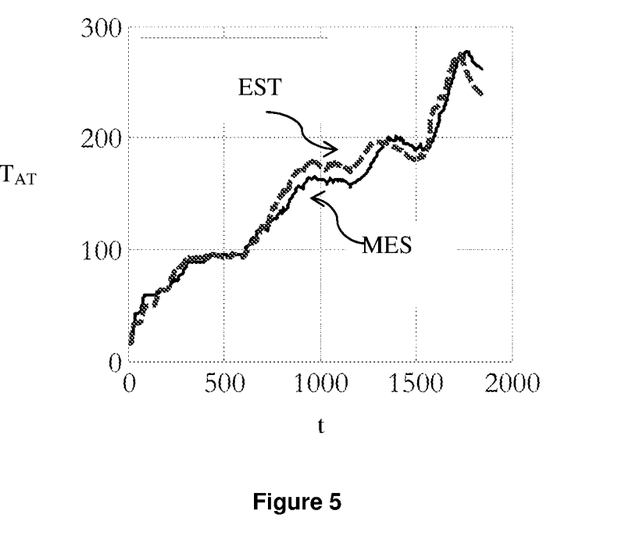
FIG. 5 shows a curve comparing the measured after-treatment temperature and the estimated after-treatment temperature as a function of time.

Term $T_{AT\_QS}(u_1(t-\Delta t), u_2(t-\Delta t))$ can be obtained by use of a map resulting from tests and it corresponds to the temperature measured at the after-treatment under steady state conditions. The values of parameters k1 and k2 can be determined from tests on vehicles. This temperature model, although simplified for computation time constraints related to the integration to the energy management strategy, gives a correct representativity, as illustrated in FIG. 5. This figure compares the measured after-treatment system temperature MES with the estimated temperature EST by use of the above equations, as a function of time and for a portion of the WLTC (Worldwide harmonized Light duty driving Test Cycle) driving cycle. This figure shows that it was possible to validate the model for various vehicle configurations (all thermal, Stop & Start and Full Hybrid: total hybridization, with both the engine and the motor providing motive power) and for the energy supervision strategy according to the invention (optimization criterion for consumption and pollutants at the after-treatment system outlet).

Calculation of $\dot{x}(u_1, u_2, x, t)$

Calculation of the dynamics of the system state, which is the state of charge of the battery, can be described in the following equations:

$$\dot{x}(u_1, u_2, x) = -\frac{I_{bat}(u_1, u_2, x)}{C_{nom}} \times 100$$

Using a model of the battery as an electric cell, the battery current can be expressed with an equation of the type:

$$I_{bat} = \frac{OCV(x)}{2 \times DCR(x)} - \sqrt{\frac{OCV(x)^2}{4 \times DCR(x)^2} - \frac{P_{elec}(u_1, u_2)}{DCR(x)}}$$

with OCV and DCR respectively being the open-circuit voltage and the internal resistance of the battery as a function of the state of charge thereof, and these characteristics can be generated as a result of tests.

The calculation of power $P_{elec}$ of the inverter supplying the electric machine can be given by an equation of the form:

$$P_{elec}(u_1, u_2, x, t) = f_{ME}(u_1, u_2)$$

where $f_{ME}$ is a map integrating the efficiency of the electric machine and of the inverter, obtained from tests depending on the operating point thereof, and thus implicitly on controls $u_1$ and $u_2$.

Calculation of λ(t)

Calculation of the Lagrange multiplier can be carried out with the following equation:

$$\lambda(t) = \lambda_{SP} + K_p(x_{SP} - x(t))$$

where $\lambda_{sp}$ and $K_p$ are calibrated to optimally contain the state of charge of the battery within the useful range thereof, $x_{SP}$ being the mean value of the state of charge of the battery.

$f(u_1, u_2, t)$, $\dot{x}(u_1, u_2, x, t)$ and $\lambda(t)$ can therefore be estimated using these various equations. Thus, the cost function H of the hybrid propulsion model is entirely determined.

3) Cost Function Minimization

Cost function H of the hybrid propulsion system model is minimized in this stage. Minimization is carried out on the allowable controls discretized in step 1). Discretization thus allows reduction of the computation time required for minimization.

This step minimizes the cost vector (Hamiltonians given by the equation of H) associated with each allowable control in order to determine which is the optimal control.

According to an embodiment of the invention, minimization is performed using Pontryagin's minimum principle.

According to an embodiment of the invention, the minimization step allows determination of optimal torque setpoints for at least one of the thermal engine, the electric machine and an optimal control setpoint for the kinematic chain.

4) Control Application

The invention allows determination of torque setpoints for at least one of the hybrid propulsion driving system and a control setpoint for the kinematic chain. Application of these setpoints to at least one of the thermal engine, to the electric machine and the kinematic chain allows obtaining a decrease in pollution emissions and the fuel consumption can also be limited.

The dynamic optimization period is suited to the physical phenomena involved in the engine, in this instance the production of pollution emissions.

The method according to the invention can be used for motor vehicles. However, it can be used in the field of road transport, two-wheelers, in the rail sector, the naval sector, the aeronautics sector, for hovercraft and amphibious vehicles.

The method according to the invention is particularly suitable for "Full Hybrid" propulsion systems, but it can also be suited for "Stop & Start" or "Mild Hybrid" type hybridization. "Full Hybrid" type hybridization corresponds to a completely hybrid system where the electric motor(s) are powerful enough to provide propulsion alone for a limited time. "Stop & Start" type hybridization corresponds to a control system that switches off the thermal engine when the vehicle is at standstill in neutral gear and restarts it when reactivated by the driver, by use of a low-power electric machine. The "Mild Hybrid" type propulsion system is equipped with a low-power electric machine and a regenerative braking system that provides additional power at low engine speed or during a high acceleration phase. For a "Mild Hybrid" propulsion system, the electric machine is not capable of providing traction of a vehicle alone.

VARIANT EMBODIMENTS

According to an implementation of the invention (that can be combined with all the variant embodiments described), discretization can also be a function of the state of charge SOC of the vehicle and of vehicle speed $V_{veh}$.

According to a first embodiment of the invention, filtering of the torque setpoint of the hybrid propulsion system is performed with, the stages of the process being carried out for the filtered setpoint. Filtering can be a preventive anti-surge filter that filters the driver's torque requirement to limit surges.

Figure 2:
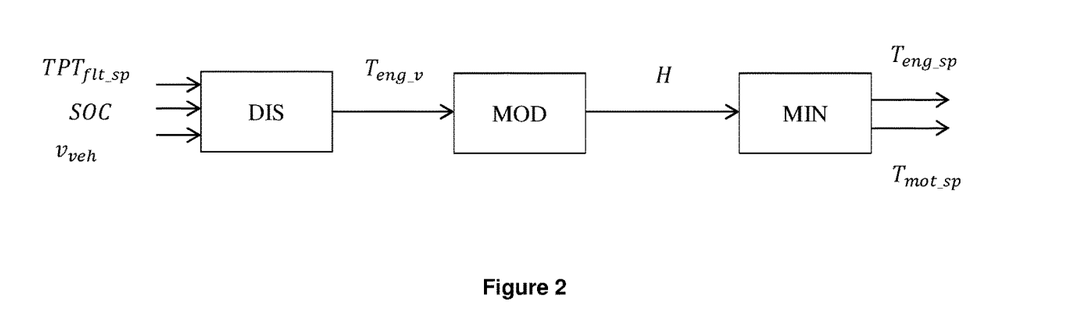
FIG. 2 illustrates a first embodiment of the method according to the invention.

According to a variant of this first embodiment of the invention, the control method determines the torque setpoints of the thermal engine $T_{eng\_sp}$ and of the electric machine $T_{mot\_sp}$ from the filtered propulsion system torque setpoint. FIG. 2 illustrates the steps of the control process for this variant embodiment. According to this variant, discretization is performed from a filtered value $TPT_{flt\_sp}$ of the torque setpoint of the hybrid propulsion system. Without limitation, discretization is also a function of the state of charge SOC of the vehicle and of vehicle speed $V_{veh}$. The discretization step allows determination of the allowable thermal engine torques $T_{eng\_v}$. The modeling and minimization steps remain unchanged in relation to the embodiment described in connection with FIG. 1. The minimization step allows determination of the torque setpoints of the thermal engine $T_{eng\_sp}$ and of the electric machine $T_{mot\_sp}$.

According to a second embodiment of the invention, the determined control corresponds to the state of the kinematic chain or for example the control of the gearbox ratio of the kinematic chain. For this embodiment, the calculation principle (discretization, modeling and minimization) is the same as for the torque optimization, except that this allowable control vector $v_{adm}$ is not limited to all the possible torques $T_{eng-v}$, and it also contains all the allowable kinematic chain states $ECC_v$. Indeed, in order to determine which is the optimal kinematic chain state, the optimal torque distribution over each of the kinematic chain states to be compared is preferably determined beforehand. In fact, it is the comparison of the costs of the optimal torque distributions for each allowable kinematic chain state that allows the optimum to be determined.

Figure 3:
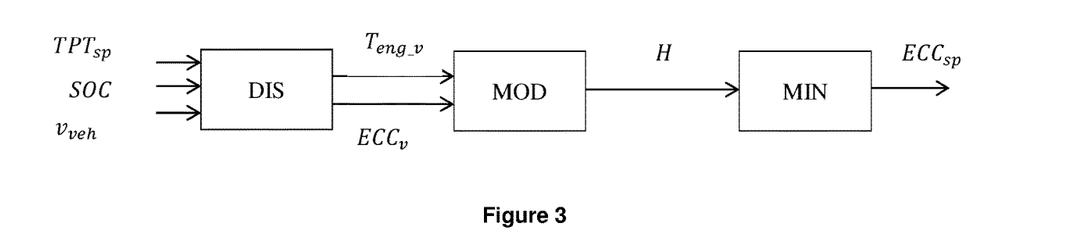
FIG. 3 illustrates a second embodiment of the method according to the invention.

FIG. 3 illustrates the steps of the method according to this second embodiment. Discretization is performed from an unfiltered value $TPT_{sp}$ of the torque setpoint of the hybrid propulsion system. Without limitation, discretization is also a function of the state of charge SOC of the vehicle and of vehicle speed $V_{veh}$. The modeling and minimization steps remain unchanged in relation to the embodiment described in connection with FIG. 1 (or FIG. 2), except that allowable control vector $v_{adm}$ also comprises all the allowable kinematic chain states $ECC_v$. The minimization step allows determination of a control setpoint for the kinematic chain $ECC_{sp}$, which can be a kinematic chain gear ratio setpoint.

According to a third embodiment of the invention, at least one of a torque setpoint for the thermal engine $T_{eng\_sp}$ and a torque setpoint for the electric machine $T_{mot\_sp}$ is determined by use of the filtered torque setpoint of the propulsion system $TPT_{flt\_sp}$. Steps 1) to 3) are repeated to determine a control setpoint for the kinematic chain $ECC_{sp}$ by use of unfiltered torque setpoint $TPT_{sp}$. The controls are applied to the hybrid propulsion system. For this embodiment, steps 1) to 3) are thus repeated twice which is once with a filtered torque setpoint $TPT_{flt\_sp}$ and once with a raw (unfiltered) torque setpoint $TPT_{sp}$. These two determinations can be performed in parallel. The advantage of separating the torque optimization from the kinematic chain state optimization lies in the impact of the comfort strategies that modify the driver's wheel torque requirement. These filtering strategies, such as the preventive anti-surge filter, filter the torque requirement of the driver $TPT_{sp}$ as a function of the current state of the kinematic chain. Optimization of the torque distribution is achieved from this filtered torque setpoint $TPT_{fit\_sp}$. However, the optimal kinematic chain state is preferably selected using raw torque setpoint $TPT_{sp}$. Having to use different input signals justifies the need to perform two optimizations in parallel.

According to a variant embodiment, repeating steps 1) to 3) can be done according to the variant embodiments illustrated in FIGS. 2 and 3.

The invention further relates to a computer program product downloadable from a communication network and/ or recorded on a computer readable medium and/or controller or server executable. This program comprises program code instructions for implementing the method as described above when the program is executed on a computer or a controller.

Furthermore, the invention relates to a hybrid propulsion system for a vehicle. The hybrid propulsion system comprises at least one electric machine powered by an electrical energy storage system, a thermal engine, a kinematic chain and a system for after-treatment of the pollutant emissions (notably NOx) of the thermal engine. The hybrid propulsion system comprises a control for carrying out the following steps:

acquiring of a torque setpoint $TPT_{sp}$ of the propulsion system;

discretizing at least part of the controls allowable by the propulsion system which allows reaching the torque setpoint of the propulsion system;

constructing a model of the propulsion system connecting a cost function to a propulsion system control with the cost function being a function of the consumption of the propulsion system and of the pollution emissions at the outlet of the after-treatment system;

determining a control of the propulsion system by minimizing the cost function for the discretized allowable controls, and applying the control to the propulsion system.

The control can be compatible with all the variants of the control method described above.

Furthermore, the invention relates to a vehicle comprising such a hybrid propulsion system. The vehicle according to the invention can be a motor vehicle. However, it can be any vehicle type in the field of road transport, two-wheelers, in the rail sector, the naval sector, the aeronautics sector, hovercraft and amphibious vehicles.

Comparative Example

This example shows the advantages of the control method according to the invention. The control method according to the invention is compared with control methods of the prior art. The examples presented here are experimental validations of test bench results.

Application case:
Utility vehicle, mass: 2700 kg
Diesel engine: 120 kW
Electric motor: 50 kW.

The control method has been tested and compared on the engine test bench over the WLTC cycle that will be the official certification standard from the Euro 7 emissions standard.

The test apparatus that is used is a high-dynamic engine test bench with gas analysis cabinet for pollutant emissions measurement.

The engine used has a wide EGR area, standard in Euro 6c. This is an important point because, so far, many energy supervision works aimed at reducing consumption and pollution emissions have been validated only with Euro 5 engines. Now, a Euro 5 diesel engine comprises two relatively different operating areas: in the rather small area corresponding to the operating points of the NEDC driving cycle, exhaust gas recirculation (EGR) is used. Therefore, this area has low nitrogen oxides levels and a degraded fuel consumption. In the second area, outside the cycle, the engine adjustments are optimized with only a consumption criterion and EGR is not used. It is therefore no surprise that energy supervision manages to greatly vary the compromise between NOx emissions and fuel consumption.

For this example, the control method according to the invention is compared with a control method of the prior art where only the fuel consumption of the vehicle is optimized, and with a control method of the prior art where the consumption and the emissions at the engine outlet (before after-treatment) are optimized.

Figure 6:
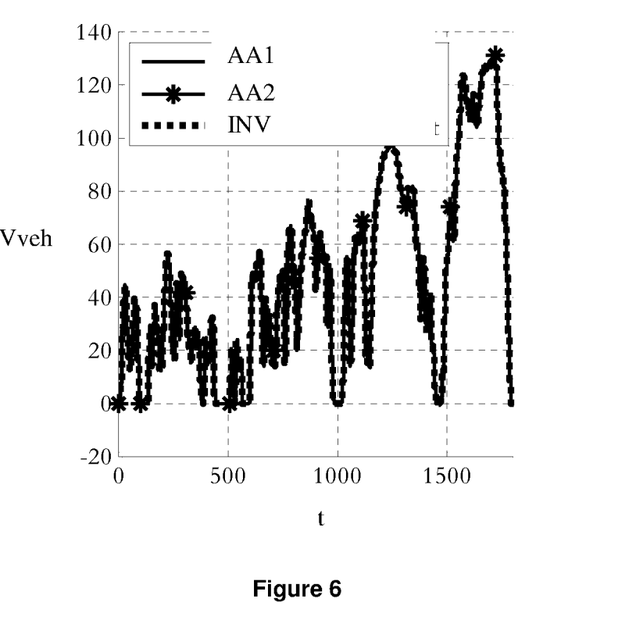
FIG. 6 illustrates, for one example, comparative curves of the vehicle speed for two control methods according to the prior art, and for an embodiment according to the invention.
Figure 7:
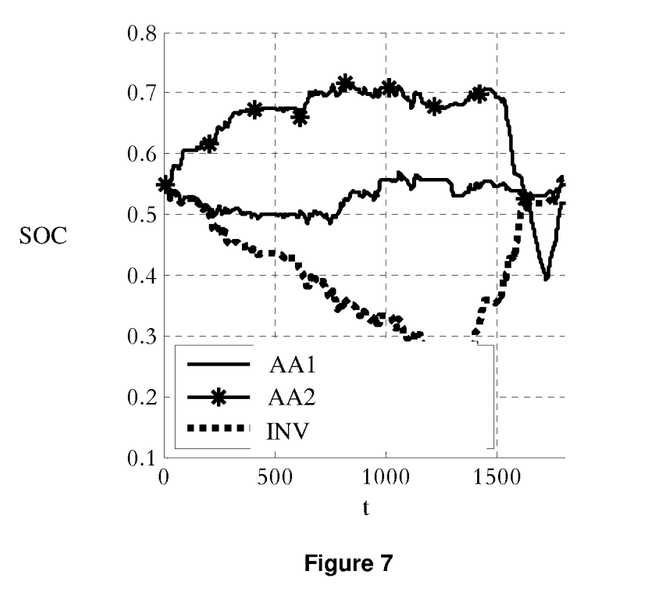
FIG. 7 illustrates, for the same example, comparative curves of the state of charge of the battery for two control methods according to the prior art, and for an embodiment according to the invention.
Figure 8:
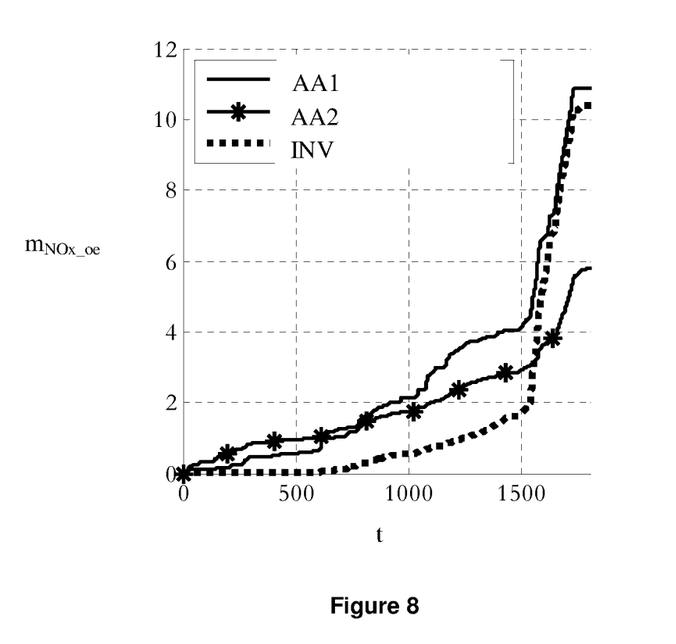
FIG. 8 illustrates, for the same example, comparative curves of the cumulative NOx emissions at the engine outlet for two control methods according to the prior art, and for an embodiment according to the invention.
Figure 9:
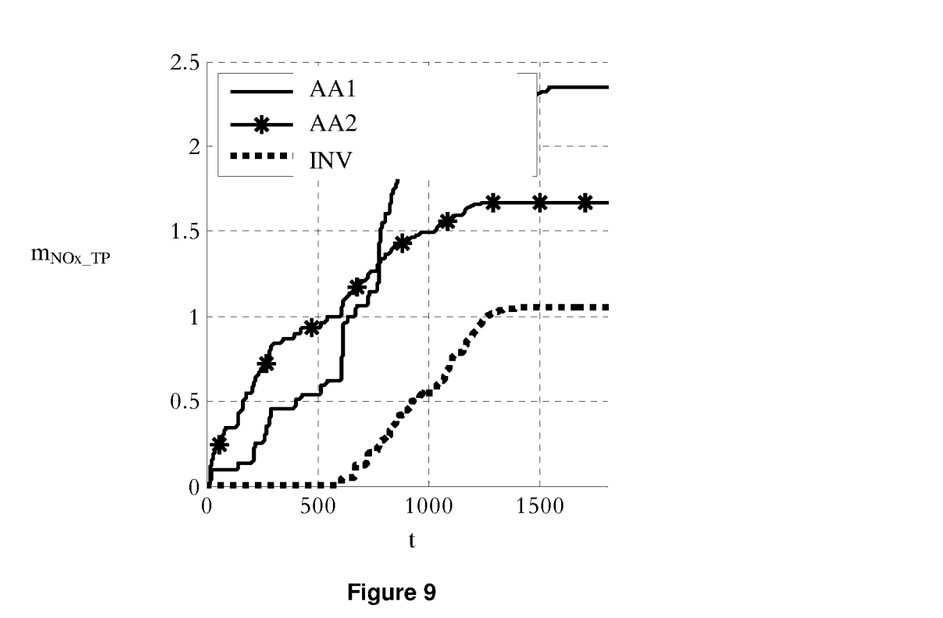
FIG. 9 illustrates, for the same example, comparative curves of the cumulative NOx emissions at the after-treatment system outlet for two control methods according to the prior art, and for an embodiment according to the invention.
Figure 10:
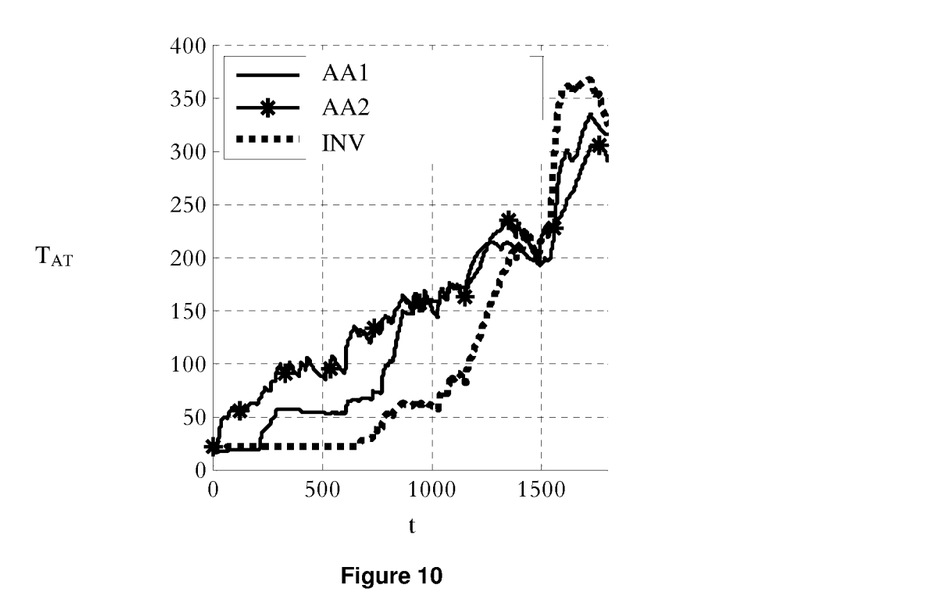
FIG. 10 illustrates, for the same example, comparative curves of the after-treatment system temperature for two control methods according to the prior art, and for an embodiment according to the invention.
Figure 11:
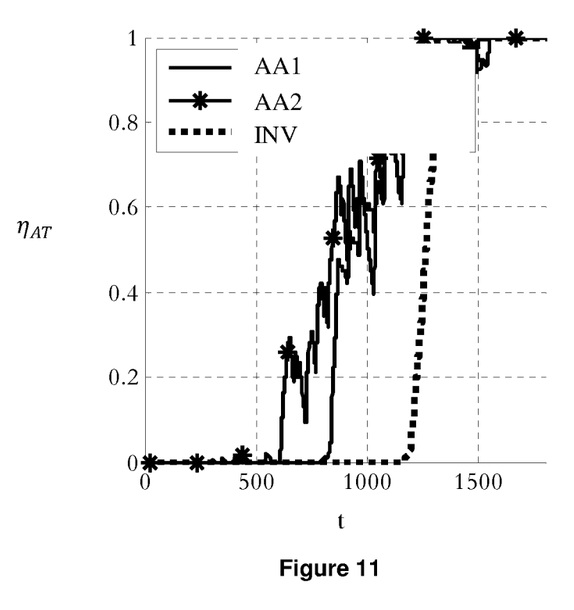
FIG. 11 illustrates, for the same example, comparative curves of the after-treatment system efficiency for two control methods according to the prior art, and for an embodiment according to the invention.

The experimental results are given in Table 1 and in FIGS. 6 to 11. The control method according to the invention is denoted by INV. The method according to the prior art wherein only consumption is optimized is denoted by AA. The method according to the prior art wherein consumption and emissions at the engine outlet are optimized is denoted by AA2. FIG. 6 shows the curves of vehicle speed $V_{veh}$ as a function of time for the three methods. FIG. 7 relates to the curves of the state of charge SOC of the battery for the three methods. FIG. 8 relates to the cumulative pollutant emissions at the thermal engine outlet $m_{NO_x EO}$ for the three methods. FIG. 9 illustrates the cumulative pollutant emissions at the after-treatment system outlet $m_{NO_x TP}$ for the three methods. FIG. 10 shows the curves of the after-treatment system temperature $T_{AT}$ for the three compared control methods. FIG. 11 illustrates the curves of the after-treatment system efficiency $\eta_{AT}$ for the three control methods.

In Table 1 and in FIGS. 6 to 11, it is noted to be that each control method indeed allows obtaining the same speed profile (FIG. 6) as the control methods of the prior art AA1 and AA2. Moreover, it can be noted that each method allows the associated parameter to be minimized since the minimum value of the optimized associated parameter is indeed obtained in each one of the three cases. In relation to state of the art AA1, which corresponds to the strategy optimizing the fuel consumption, it appears that it is possible to significantly (55%) reduce the nitrogen oxide NOx emissions at the exhaust, by use of the control method of the invention INV, at the price of a slight consumption increase (2%). The control method according to the invention INV therefore first achieves all-electric motoring or illustrated by the drop in the state of charge of the battery in FIG. 7. Then, the thermal engine is started and used at points that favor actuation of the after-treatment, which is very rapid, as illustrated in FIG. 11, and also is effective as illustrated in FIG. 10. Therefore, the cumulative NOx emissions at the exhaust remain low as illustrated in FIG. 9, while the cumulative NOx emissions at the engine outlet are close to those of the method according to the prior art AA1 (FIG. 8).

TABLE 1

| Comparative example | | | |
| --- | --- | --- | --- |
|  | Fuel consumption [L/100 km] | Nitrogen oxides engine outlet [mg/km] | Nitrogen oxides exhaust [mg/km] |
| AA1 | 8.25 | 466 | 101 |
| AA2 | 8.57 | 249 | 72 |
| INV | 8.42 | 446 | 45 |

The invention claimed is:

1. A method of controlling a hybrid propulsion system comprising at least one electric machine, at least one thermal engine, at least one electrical energy storage system supplying electrical energy to the at least one electric machine, a kinematic chain for coupling the at least one electric machine and the at least one thermal engine, and a pollution emissions after-treatment system at an outlet of the at least one thermal engine with a torque setpoint of the propulsion system being acquired, comprising:

a) discretizing all allowable controls of the propulsion system to reach the torque setpoint of the propulsion system by gridding all allowable control solutions;

b) constructing a model of the propulsion system connecting a cost function to a control of the propulsion system, the cost function being a function of consumption of the propulsion system and of the pollution emissions at an outlet of the pollution emissions after-treatment system;

c) determining a control for the propulsion system by minimizing the cost function of the model of the propulsion system for the allowable discretized controls; and d) controlling the hybrid propulsion system by applying the determined control to the hybrid propulsion system.

2. A method as claimed in claim 1, wherein the control is at least one of a torque setpoint of the at least one thermal engine, a torque setpoint of the at least one electric machine and a control setpoint of the kinematic chain.

3. A method as claimed in claim 2, wherein the torque setpoint of the propulsion system is filtered.

4. A method as claimed in claim 3, wherein a torque setpoint of at least one of the at least one thermal engine and a torque setpoint of the at least one electric machine is determined by use of the filtered torque setpoint of the propulsion system and steps a) to c) are repeated to determine a control setpoint of the kinematic chain by use of an unfiltered torque setpoint and the controls are applied to the hybrid propulsion system.

5. A method as claimed in claim 4, wherein the discretizing at least part of the allowable controls accounts for a state of at least one of charge of the electrical energy storage system and speed of the propulsion system.

6. A method as claimed in claim 3, wherein the discretizing at least part of the allowable control accounts for a state of at least one of charge of the electrical energy storage system and speed of the propulsion system.

7. A method as claimed in claim 2, wherein the discretizing at least part of the allowable control accounts for a state of at least one of charge of the electrical energy storage system and speed of the propulsion system.

8. A method as claimed in claim 2, wherein the cost function of the hybrid propulsion system model is written with an equation:

$$H(u_1,u_2,x,t)=f(u_1,u_2,t)+\lambda(t)\times \dot{x}(u_1,u_2,x,t)$$

with:

$$f(u1,u_2,t)=(1-\alpha)\times \dot{m}_f(u_1,u_2,t)+\alpha \times \dot{m}_{NO_xTP}(u_1,u_2,t),$$
wherein $u_1$ is torque control of the at least one thermal engine $T_{eng}$;
$u_2$ is control of the kinematic chain ECC;
x is a state of charge of the electrical energy storage system;
$m_f$ is fuel consumption of the at least one thermal engine;
$m_{NO_xTP}$ is NOx emissions at the outlet of the after-treatment system;
α is a calibration variable;
λ is a Lagrange multiplier; and
t is time.

9. A method as claimed in claim 8, wherein the fuel consumption of the at least one thermal engine is obtained by using a map.

10. A method as claimed in claim 8, wherein the pollution emissions $m_{NO_xTP}$ are obtained with an equation:

$$\dot{m}_{NO_xTP}(u_1,u_2,x,t)=\dot{m}_{NO_xEO}(u_1,u_2,x,t)\times(1-\eta_{AT}(T_{AT}))$$

with:

$m_{NO_xEO}$ being pollution emissions an outlet of the at least one thermal engine,
$\eta_{AT}$ being efficiency of the after-treatment system, and
$T_{AT}$ being temperature of the after-treatment system.

11. A method as claimed in claim 1, wherein the torque setpoint of the propulsion system is filtered.

12. A method as claimed in claim 11, wherein a torque setpoint of at least one of the at least one thermal engine and a torque setpoint of the at least one electric machine is determined by use of the filtered torque setpoint of the propulsion system and steps a) to c) are repeated to determine a control setpoint of the kinematic chain by use of an unfiltered torque setpoint and the controls are applied to the hybrid propulsion system.

13. A method as claimed in claim 12, wherein the discretizing at least part of the allowable control accounts for a state of at least one of charge of the electrical energy storage system and speed of the propulsion system.

14. A method as claimed in claim 12, wherein the cost function of the hybrid propulsion system model is written with an equation:

$$H(u_1,u_2,x,t)=f(u_1,u_2,t)+\lambda(t)\times \dot{x}(u_1,u_2,x,t)$$

with:

$$f(u1,u_2,t)=(1-\alpha)\times \dot{m}_f(u_1,u_2,t)+\alpha \times \dot{m}_{NO_xTP}(u_1,u_2,t),$$
wherein $u_1$ is torque control of the at least one thermal engine $T_{eng}$;
$u_2$ is control of the kinematic chain ECC;
x is a state of charge of the electrical energy storage system;
$m_f$ is fuel consumption of the at least one thermal engine;
$m_{NO_xTP}$ is NOx emissions at the outlet of the after-treatment system;
α is a calibration variable;
λ is a Lagrange multiplier; and
t is time.

15. A method as claimed in claim 14, wherein the pollution emissions $m_{NO_xTP}$ are obtained with an equation:

$$\dot{m}_{NO_xTP}(u_1,u_2,x,t)=\dot{m}_{NO_xEO}(u_1,u_2,x,t)\times(1-\eta_{AT}(T_{AT}))$$

with:

$m_{NO_xEO}$ being pollution emissions an outlet of the at least one thermal engine, $\eta_{AT}$ being efficiency of the after-treatment system, and $T_{AT}$ being temperature of the after-treatment system.

16. A method as claimed in claim 15, wherein the pollution emissions $m_{NO_xEO}$ at the outlet of the thermal engine are determined by using a model or a map.

17. A method as claimed in claim 16, wherein temperature of the after-treatment system is estimated by use of a formula:

$$T_{AT}(t) = T_{AT}(t - \Delta t) + \Delta t \times \frac{h_1(t) + h_2(t)}{I}$$

with:

$h_1(t)=k_1\times(T_0-T_{AT}(t-\Delta t))$ $h_2=k_2\times[T_{AT\,QS}(u_1(t-\Delta t),u_2(t-\Delta t))-T_{AT}(t-\Delta t)]$ $T_{AT\,QS}(u_1(t-\Delta t), u_2(t-\Delta t))$ measured steady-state temperature at the after-treatment, with $\Delta t$ being time interval;

k1 being equivalent thermal resistance of exchanges with an outside;

k2 being equivalent thermal resistance of exchanges with exhaust gases; and

I being thermal inertia of the after-treatment system.

18. A method as claimed in claim 15, wherein temperature of the after-treatment system is estimated by use of a formula:

$$T_{AT}(t) = T_{AT}(t - \Delta t) + \Delta t \times \frac{h_1(t) + h_2(t)}{I}$$

with:

$h_1(t)=k_1\times(T_0-T_{AT}(t-\Delta t))$ $h_2=k_2\times[T_{AT\,QS}(u_1(t-\Delta t),u_2(t-\Delta t))-T_{AT}(t-\Delta t)]$ $T_{AT\,QS}(u_1(t-\Delta t), u_2(t-\Delta t))$ measured steady-state temperature at the after-treatment, with $\Delta t$ being time interval;

k1 being equivalent thermal resistance of exchanges with an outside;

k2 being equivalent thermal resistance of exchanges with exhaust gases; and

I being thermal inertia of the after-treatment system.

19. A method as claimed in claim 11, wherein the discretizing at least part of the allowable control accounts for a state of at least one of charge of the electrical energy storage system and speed of the propulsion system.

20. A method as claimed in claim 11, wherein the cost function of the hybrid propulsion system model is written with an equation:

$$H(u_1,u_2,x,t)=f(u_1,u_2,t)+\lambda(t)\times\dot{x}(u_1,u_2,x,t)$$

with:

$f(u1,u_2,t)=(1-\alpha)\times\dot{m}_f(u_1,u_2,t)+\alpha\times\dot{m}_{NO_xTP}(u_1,u_2,t),$
wherein $u_1$ is torque control of the at least one thermal engine $T_{eng}$;

$u_2$ is control of the kinematic chain ECC;

x is a state of charge of the electrical energy storage system;

$m_f$ is fuel consumption of the at least one thermal engine;

$m_{NO_xTP}$ is NOx emissions at the outlet of the after-treatment system;

$\alpha$ is a calibration variable;

$\lambda$ is a Lagrange multiplier; and t is time.

21. A method as claimed in claim 1, wherein the discretizing at least part of the allowable control accounts for a state of at least one of charge of the electrical energy storage system and speed of the propulsion system.

22. A method as claimed in claim 21, wherein the cost function of the hybrid propulsion system model is written with an equation:

$$H(u_1,u_2,x,t)=f(u_1,u_2,t)+\lambda(t)\times\dot{x}(u_1,u_2,x,t)$$

with:

$f(u1,u_2,t)=(1-\alpha)\times\dot{m}_f(u_1,u_2,t)+\alpha\times\dot{m}_{NO_xTP}(u_1,u_2,t),$
wherein:

$u_1$ is torque control of the at least one thermal engine $T_{eng}$;

$u_2$ is control of the kinematic chain ECC;

x is a state of charge of the electrical energy storage system;

$m_f$ is fuel consumption of the at least one thermal engine;

$m_{NO_xTP}$ is NOx emissions at the outlet of the after-treatment system;

$\alpha$ is a calibration variable;

$\lambda$ is a Lagrange multiplier; and t is time.

23. A method as claimed in claim 1, wherein the cost function of the hybrid propulsion system model is written with an equation:

$$H(u_1,u_2,x,t)=f(u_1,u_2,t)+\lambda(t)\times\dot{x}(u_1,u_2,x,t)$$

with:

$f(u1,u_2,t)=(1-\alpha)\times\dot{m}_f(u_1,u_2,t)+\alpha\times\dot{m}_{NO_xTP}(u_1,u_2,t),$
wherein:

$u_1$ is torque control of the at least one thermal engine $T_{eng}$;

$u_2$ is control of the kinematic chain ECC;

x is a state of charge of the electrical energy storage system;

$m_f$ is fuel consumption of the at least one thermal engine;

$m_{NO_xTP}$ is NOx emissions at the outlet of the after-treatment system;

$\alpha$ is a calibration variable;

$\lambda$ is a Lagrange multiplier; and t is time.

24. A method a claimed in claim 1, wherein minimization is carried out by use of Pontryagin's minimum principle.

25. A computer program recorded on a tangible computer storage medium or a controller which executes, program code instructions for implementing the method as claimed in claim 1, when the computer program is executed.

26. A hybrid propulsion system of a vehicle, comprising at least one electric machine, at least one thermal engine, at least one electrical energy storage system supplying electrical energy to the electric machine and at least one system for after-treatment of the pollution emissions of the thermal engine, wherein the propulsion system is controlled by the method as claimed in claim 1.

27. A motor vehicle, comprising a hybrid propulsion system as claimed in claim 26.

\* \* \* \* \*